United States Patent Office 2,807,567
Patented Sept. 24, 1957

2,807,567
PREPARATION FOR THE TREATMENT OF ALLERGIC DISEASES

Ernst Rothlin and Jean-Pierre Bourquin, Basel, Switzerland, assignors, by mesne assignments, to Saul & Co., Newark, N. J., as nominee of Fidelity Union Trust Company, executive trustee under Sandoz trust No Drawing. Application June 15, 1953,
Serial No. 361,866

Claims priority, application Switzerland June 2, 1953

7 Claims. (Cl. 167—65)

The present invention relates to a combination for the treatment of allergic diseases, consisting of a mixture of an organic calcium salt, such as calcium gluconolactobionate (Ca—S), and a specific antihistamine, 1-methyl-4-amino-N'-phenyl-N'-(2-thenyl)-piperidine, referred to below as AS 716, the latter being the specifically acting component of the combination, which is referred to below as ASC 16.

Pharmacological and clinical investigations carried out with ASC 16 have shown that by combining the two components their effects are potentiated and that the properties on which the practical application of ASC 16 is based are considerably superior to those of other medicaments used for the same purpose. It has proved an excellent remedy for the treatment of a variety of allergic diseases, including acute and chronic eczema, urticaria, refractory forms of pruritus, etc.

It is known that the efficacy of antihistamine preparations employed in medicine for the treatment of allergic diseases is due to their antagonism to histamine. This action is possessed by a very large number of chemical compounds; however, many of them are either too toxic to be employed clinically or they cause undesirable side-effects which hinder the patient in carrying out his normal occupation. It is also known that calcium has long been recognized as an important agent in the treatment of allergic diseases, owing to its ability to reduce cellular and capillary permeability.

For the first time a therapeutic agent has now been created which combines low toxicity and absence of side-effects with a very high efficacy against allergic diseases. The merit of this preparation lies in the fact that, as will be shown hereinafter, the desired effects of the specific component AS 716 are markedly enhanced, while the undesirable effects are greatly diminished.

The first pharmacological studies were carried out with the antihistamine component (AS 716) alone. A comparison was made between AS 716 and other antihistamines in respect of the antagonism to histamine (on the small intestine of the guinea pig), the antagonism to adrenaline (on the seminal vesicle of the guinea pig and on the uterus of the rabbit), the inhibition of the action of histamine on isolated arterial strips and the inhibition of the action of acetylcholine on the isolated perfused superior cervical ganglion. All these tests demonstrated that AS 716 can be classed among the most powerful of the antihistamine compounds at present on the market. The antagonism between AS 716 and acetylcholine, as tested on the seminal vesicle and the small intestine of the guinea pig, was between 100 and 1000 times as great as that of other antihistamines. This powerful inhibition of the action of acetylcholine, coupled with the specific antihistaminic action of AS 716, is particularly striking in comparison with the other substances tested and is a prominent factor in rendering it suitable for therapeutic use. In addition to these tests on isolated organs, the antihistaminic activity was also examined in vivo in guinea pigs: 0.07 mg./kg. protected 50% of the animals against the normal L. D. 100 of subcutaneously administered histamine (8.8 mg./kg.); 20 mg./kg. protected 53% of the animals against 50 times the normal L. D. 100 of subcutaneous histamine, while 23% of the animals pretreated in this way tolerated 100 times the L. D. 100 of subcutaneous histamine. The local anaesthetic action of AS 716 on the cornea in rabbits was found to be approximately half as strong as that of a powerful local anaesthetic and approximately twice as strong as that of the other antihistamines examined.

Toxicity tests on AS 716 gave the following results: In acute experiments, the L. D. 50 i. v. was found to be 58 mg./kg. in the mouse, 56 mg./kg. in the guinea pig and 30.5 mg./kg. in the rabbit. In guinea pigs, the daily administration of 69 mg./kg. s. c. killed 50% of the animals after 30 days. The toxicity of AS 716 is thus considerably below that of other antihistamines. Even more striking, however, was the low toxicity of the combination Ca—S+AS 716 (ASC 16). If the L. D. 50 of a combination of two drugs is determined and the dose of each component then calculated as a percentage of the L. D. 50 of the component given alone, the two values obtained as a rule add up to less than 100%, i. e. the two drugs increase each other's toxicity. There was no a priori reason for assuming that the combination Ca—S+AS 716 (ASC 16) would exhibit any fundamental difference in this respect. On intravenous administration of ASC 16, both the mouse and the guinea pig tolerate 60–62% of the L. D. 50 of AS 716 plus 58–68% of the L. D. 50 of Ca—S. The sum of the partial toxicities is thus, in any case, greater than 100%, which shows that the two components decrease each other's toxicity. This is demonstrated still more clearly by comparing the survival times of rabbits treated with lethal does of AS 716 with and without Ca—S. After the administration of 40 mg./kg. AS 716 in sodium chloride solution, five animals all died within 1 to 6 minutes, whereas when 5 rabbits were given the same dose in combination with Ca—S, one died after 18 minutes, three after 12 to 20 hours and the fifth survived the experiment. The L. D. 50 in rabbits—measured as the dosage causing death of half the animals within 12 hours—increases from 34 mg./kg. without Ca—S to more than 50 mg./kg. when Ca—S is administered simultaneously.

In addition to these properties, ASC 16 has the therapeutically important advantage that it causes a greater reduction in permeability than either of its components. The effect of a medicament on permeability can be observed objectively on the blood-aqueous humor barrier of the eye. The known drugs tested in this way and found to be effective include cortisone, calcium gluconate and the various antihistamines. All the preparations tested so far are capable of causing a more or less marked reduction in the increased permeability of the diseased eye, but none of them has any effect on normal permeability. It has been found that ASC 16 is not only effective in relatively small doses in decreasing abnormally high permeability, but is also the only preparation capable of reducing the normal permeability of the blood-aqueous humor barrier. From this it follows that, from the therapeutic point of view, the combination ASC 16 is able to exert a beneficial effect in allergic conditions affecting the vascular system (urticaria, rhinitis, etc.) and can also be employed prophylactically to reduce the increased tendency to oedema usually exhibited by allergic patients.

In addition to the pharmacological investigations described, numerous clinical trials have been carried out with ASC 16 and the excellence of its properties, as evidenced in animal experiments, was fully confirmed when the preparation was employed therapeutically in man. The clinical trials were carried out at the Dermatologische Universitätsklinik of the Kantonsspital in Zurich and so far the following clinical conditions have been studied:

Urticaria, chronic and acute
Pruritus, essential
Pruritus in eczema
Neurodermatitis with pruritus
Vasomotor rhinitis.

The following typical case history may be cited: W. J. aged 43. Since the beginning of 1952 had suffered from generalized pruritus. No discoverable cause despite very comprehensive investigation (including allergy tests). Very refractory to therapy. Antihistamines, calcium and ganglion blocking agents were ineffective. After the first injection of ASC 16 the patient already experienced a considerable reduction in pruritus. Subsequently, he was free from symptoms as long as daily injections of 1 ampoule ASC 16 were given. After about 30 injections, pruritus did not return.

As far as side-effects are concerned, tests show that in comparison with other antihistamines much larger quantities of ASC 16 can be administered without producing undesirable reactions, such as drowsiness, giddiness, tremors, nausea and vomiting. Clinical experience has shown that the intravenous injection of ASC 16 does not cause any unpleasant sensations. The feeling of warmth is not appreciably greater than that after an ordinary injection of calcium gluconolactobionate; in fact, in some cases, it was less pronounced. From these observations it is clear that the combined antihistamine-calcium preparation, besides being highly effective, is not only better tolerated in therapeutic doses but also has a lower toxicity than AS 716 alone.

The antihistamine AS 716 involved in the present invention may be used in the form of free base—1-methyl-4-amino-N'-phenyl-N'-(2-thienyl)-piperidine—or in the form of therapeutically useful salts thereof, such for example as the tartrate, citrate, sulfate, hydrochloride, oxalate, ethan-sulfonate, methane-sulfonate, etc. The said antihistamine may advantageously be prepared in the manner described in the copending application, Serial No. 332,792, filed November 26, 1952, by Arthur Stoll and Jean-Pierre Bourquin, namely, as follows (the relationship between parts by weight and parts by volume being the same as that between the gram and cubic centimeter):

190.12 parts by weight of 1-methyl-4-amino-N'-phenyl-piperidine are dissolved in the five- to six-fold quantity of absolute xylene and then, while refluxing and stirring the resultant solution, 43.92 parts by weight of sodamide (10% excess) are added in the course of 2 to 3 hours. Then, without interrupting the heating, 144.5 parts by weight of freshly distilled 2-thenyl chloride, dissolved in the two-fold quantity of absolute xylene, are added dropwise in the course of 1½ hours, the mixture being thereupon heated for 40 to 42 hours at an oil-bath temperature of 170° C. After the mixture has cooled, any sodamide which is present is decomposed with 10 to 20 parts by weight of NH₄Cl, xylene is added, and the mixture shaken out with about 600 parts by volume of water. The aqueous extract is clarified by filtration and then shaken out with benzene. The xylene and benzene extracts are concentrated by evaporation under reduced pressure, any remaining unreacted 2-thenyl chloride removed at a pressure of 11 mm. and at an oil-bath temperature of 110° C., and the residue from the evaporation then distilled at a pressure of 0.1 mm. Unreacted 1-methyl-4-amino-N'-phenyl-piperidine distils over first at 110–120° C., followed by impure 1-methyl-4-amino-N'-phenyl-N'-(2-thenyl)-piperidine

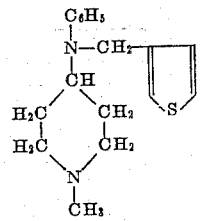

at 180–190° C.

In order to purify the latter compound, the crude base is dissolved in the six-fold quantity of absolute alcohol. A five-fold quantity of an absolute alcoholic solution of oxalic acid ($H_2C_2O_4 \cdot 2H_2O$) containing the stoichiometric quantity of oxalic acid (+10% excess) to form the mono-oxalate, is then added, a considerable evolution of heat taking place. Upon cooling of the reaction mixture, the mono-oxalate crystallizes out slowly, in an 80% yield. For purification purposes, the thus-obtained mono-oxalate is recrystallized from the 17-fold quantity (by volume) of absolute alcohol, with addition of animal charcoal, followed by recrystallization from the 16-fold quantity (by volume) of a mixture of alcohol and benzene (1:1). The purified mono-oxalate melts at 160–162° C. (decomposition).

To obtain the pure base, the oxalate is dissolved at about 40° in the twenty- to thirty-fold quantity (by volume) of water and, while cooling with ice-water, the solution is rendered alkaline with 3-normal aqueous NaOH solution. The base, which at first separates in the form of a milky precipitate, crystallizes in the course of several hours and is then recrystallized from the 12-fold quantity (by volume) of an alcohol-water mixture (7.5:4.5). The purified base melts at 95–97° C.

In manner analogous to that for the preparation of the mono-oxalate, the di-hydrochloride of the 1-methyl-4-amino-N'-phenyl-N'-(2-thenyl)-piperidine can also be prepared. It melts at 228–231° C. (decomposition).

Other salts of the antihistamine base are prepared in analogous manner.

In the combinations of the antihistamine and organic calcium salt according to this invention, the content of calcium (calculated as calcium metal) is preferably in the range between approximately 0.9 and approximately 4.5% by weight, while the content of antihistamine (calculated in terms of free base) is preferably in the range between approximately 0.3 and approximately 2.0% by weight.

The organic calcium salt is advantageously the salt of a hydroxy-carboxylic acid, preferably a salt such as calcium gluconate, calcium lactobionate, calcium lactate, calcium glucono-lactobionate (calcium gluconate-calcium lactobionate) or the like, and these salts may be used severally or in admixture.

The following examples set forth representative embodiments of the invention:

Example 1.—Ampoules

| | Grams |
|---|---|
| Calcium glucono-lactobionate | 13.75 |
| 1-methyl-4-amino-N'-phenyl-N'-(2-thenyl)-piperidine tartrate | 0.5 |
| Distilled water to 100 cc. | |

The solution may be used, for example, for the preparation of 10 ampoules of 10 cc. each.

The antihistamine (tartrate) is dissolved in sterile and pyrogen-free water. This solution is carefully mixed with the solution of calcium salt, sterilized by filtration through a bacteria-proof filter, and filled into ampoules which are sterilized according to the usual methods.

Example 2.—Ointment

| | Grams |
|---|---|
| 1-methyl-4-amino-N'-phenyl-N'-(2-thenyl)-piperidine | 2.0 |
| Calcium lactobionate | 17.5 |
| Emulsifier | 3.0 |
| Cetyl alcohol | 10.0 |
| Fat | 25.0 |
| Distilled water, preservative, to 100 cc. | |

The antihistamine is dissolved in the fat phase of the ointment base. With the help of a suitable emulsifier, e. g. sodium lauryl sulphonate or sodium cetyl sulphonate, an emulsion hydrogel is prepared with the watery solution of the calcium salt.

Example 3.—Tablets

| | Grams |
|---|---|
| 1-methyl-4-amino-N'-phenyl-N'-(2-thenyl)-piperidine tartrate | 0.025 |
| Calcium lacto-gluconate | 1.373 |
| Sucrose | 1.200 |
| Effervescent powder (sodium bicarbonate/citric acid-tartaric acid) to 3.8 grams. | |

The tartaric acid salt of the antihistamine is ground to a fine consistency with sucrose and granulated. Calcium lacto-gluconate, sucrose, citric acid and sodium bicarbonate are granulated separately. The dried granulates, together with flavoring matter is desired, are mixed in the prescribed proportions and the mass pressed into tablets.

In the foregoing examples, where the antihistamine tartrate is used, it may be replaced by another salt or by the free base; similarly, where the free base is used, a salt as hereinbefore disclosed may be used in its place. Moreover, the organic calcium compound in any of the examples may be replaced by another organic calcium compound, as hereinbefore disclosed.

Having thus disclosed the invention, what is claimed is:

1. A preparation for the treatment of allergic diseases, comprising essentially a calcium salt of a monobasic hydroxy carboxylic acid and a member selected from the group consisting of the antihistamine 1-methyl-4-amino-N'-phenyl-N'-(2-thenyl)-piperidine and the therapeutically useful salts thereof.

2. A preparation for the treatment of allergic diseases, comprising essentially an organic calcium salt selected from the group consisting of calcium gluconate, calcium lactobionate, calcium lactate, calcium glucono-lactobionate and mixtures thereof, and a member selected from the group consisting of the antihistamine 1-methyl-4-amino-N'-phenyl-N'-(2-thenyl)-piperidine and the therapeutically useful salts thereof.

3. A preparation for the treatment of allergic diseases, comprising essentially a calcium salt of a monobasic hydroxy carboxylic acid and a member selected from the group consisting of the antihistamine 1-methyl-4-amino-N'-phenyl-N'-(2-thenyl)-piperidine and the therapeutically useful salts thereof, the content of calcium, calculated as calcium metal, in the said preparation being not less than 0.9% by weight and the content of antihistamine, calculated in terms of free base, being not less than 0.3% by weight.

4. A preparation for the treatment of allergic diseases, comprising essentially a calcium salt of a monobasic hydroxy carboxylic acid and a member selected from the group consisting of the antihistamine 1-methyl-4-amino-N'-phenyl-N'-(2-thenyl)-piperidine and the therapeutically useful salts thereof, the content of calcium, calculated as calcium metal, in the said preparation being between approximately 0.9% and approximately 4.5% by weight, and the content of antihistamine, calculated in terms of free base, being between approximately 0.3% and approximately 2.0 percent by weight.

5. A preparation for the treatment of allergic diseases in the form of ampoule solution and comprising essentially a combination of calcium glucono-lactobionate with the anti-histamine 1-methyl-4-amino-N'-phenyl-N'-(2-thenyl)-piperidine in form of a therapeutically useful salt thereof, the content of calcium, calculated in terms of calcium metal, being not less than 0.9% by weight and the content of antihistamine, calculated in terms of the free base, not less than 0.3% by weight.

6. A preparation for the treatment of allergic diseases in the form of an ointment for external application and containing not less than 2% by weight of the antihistamine 1-methyl-4-amino-N'-phenyl-N'-(2-thenyl)-piperidine and not less than 0.9% by weight, calculated in terms of calcium metal, of a calcium salt of a monobasic hydroxy carboxylic acid.

7. A preparation for the treatment of allergic diseases in the form of tablets for oral administration, containing not less than 0.43% by weight, calculated in terms of the free base, of the antihistamine 1-methyl-4-amino-N'-phenyl-N'-(2-thenyl)-piperidine in form of a therapeutically useful salt thereof, and not less than 4.47% by weight, calculated in terms of calcium metal, of a calcium salt of a monobasic hydroxy carboxylic acid.

References Cited in the file of this patent

Ekblad: U. S. Armed Forces Med. Jour., vol. III, No. 6, pages 839–846.

Ludwig: Repertorium Pharmazeutische Spezialpraparate, 1948 Beobachter A. G., Basel, pages 147, 153.